United States Patent [19]

Stevens

[11] Patent Number: 4,807,390
[45] Date of Patent: Feb. 28, 1989

[54] INSECT ELECTROCUTION APPARATUS AND METHOD OF OPERATION

[75] Inventor: David P. Stevens, Billerica, Mass.

[73] Assignee: Armatron Internation, Inc., Melrose, Mass.

[21] Appl. No.: 164,094

[22] Filed: Mar. 4, 1988

[51] Int. Cl.$^4$ .......................... A01M 1/04; A01M 1/22
[52] U.S. Cl. .......................................... 43/112; 43/113
[58] Field of Search .................................. 43/112, 113

[56] References Cited

U.S. PATENT DOCUMENTS

| 3,998,000 | 12/1976 | Gilbert | 43/112 |
| 4,182,069 | 1/1980 | De Yoreo | 43/112 |
| 4,248,005 | 2/1981 | Hedstrom | 43/112 |
| 4,387,529 | 6/1983 | Hedstrom | 43/112 |
| 4,422,015 | 12/1983 | Nilssen | 43/112 |

Primary Examiner—Gene P. Crosby
Attorney, Agent, or Firm—Samuels, Gauthier, Stevens & Kehoe

[57] ABSTRACT

An insect electrocution apparatus and method of operation utilizing a series connected, dual coil primary of a ballast/step-up transformer to provide increased impedance only during the starting of the insect attracting fluorescent tube. The fluorescent tube is connected between the two primary coils with the fluorescent tube starter and one of the primary coils connected in series with the fluorescent tube filaments. Upon starting, both coils are energized and provide the desired amount of impedance. Once the fluorescent tube ignites, the starter and the second primary coil are operationally removed from the circuit leaving only the first primary coil to provide ballast for the fluorescent tube.

5 Claims, 1 Drawing Sheet

INSECT ELECTROCUTION APPARATUS AND METHOD OF OPERATION

BACKGROUND OF THE INVENTION

The present invention relates to insect electrocution products and, more particularly, to an improved insect electrocution product utilizing a switchable, dual primary coil combination high voltage transformer and flourescent tube ballast.

Conventional electric insect killers generally require the use of two devices working in concert: a flourescent tube with suitable phosphors to attract the insects, and a source of high voltage electricity to destroy them. The flourescent tube and high voltage power supply both employ a similar inductive component in their circuits. The flourescent tube or lamp requires a ballast to control the magnitude of the electric current flowing through the tube. The most common ballast is a simple inductor consisting of a laminated steel core surrounded by one or more windings of varnished copper wire. The required level of control is determined by three parameters: (a) the number of turns of wire, (b) the amount of iron or steel in the core, and (c) the dimension of a "gap" across the magnetic lines of flux.

There are many different designs of ballast circuits, but they generally fall into one of three categories depending on the means used to "flash" or ignite the tube when first turned on. The simplest of these, called the "preheat" circuit, is commonly used for the smaller flourescent tubes found on desk lamps and bathroom cabinets. In this circuit, a manually-operated switch or automatic device called a starter is used to create a momentary current through the filaments at each end of the tube. This heats the filaments, producing a "space charge" of electrons which lights the lamp when this preheat current is interrupted.

In order to achieve the proper control of the current during both the preheat phase and the operating phase, a ballast of a given physical size is required to meet the parameters outlined above. If this ballast is made smaller, (that is, if less steel in a smaller frame size is used), additional wire turns can be put on to compensate but—for any given number of turns—either the preheat current will be too high or the operating currents will be too low. Since tube wattages vary, e.g., 15 watt, 25 watt and 40 watt, it would be desirable to use a single purpose ballast for a wide range of tube wattages.

In recent years, the flourescent tube ballast and high voltage transformer have been combined into a single component. These devices use the same standard, cruciform-type lamination that has been used throughout the industry for the current-limited high voltage transformer; however, by creating an appropriate gap between the inner and outer laminations, the primary coil can also be used as the ballast for the tube. Unfortunately, this arrangement is not able to achieve the same degree of control over the several parameters of flourescent tube operation as a conventional, single-purpose ballast. Within the limit of 500 milliamperes, however, the span of control of such a device having the same lamination size and stack thickness as a conventional high voltage transformer is adequate for commercial purposes.

Beyond this limit, the span between operating and preheat current levels is too great for reliable operation. Regaining such control would require a substantial increase in lamination size or stack thickness, thereby decreasing the cost advantages over using two discrete components.

Since the operating level of commercially important 40 watt flourescent tubes is up to 800 milliamperes, it is desirable to reduce the span to that of a conventional ballast at these current levels.

It is accordingly, a general object of the present invention to provide an improved combination high voltage transformer and flourescent tube ballast for insect electrocution products.

It is a specific object of the invention to provide a switchable, dual primary coil ballast/step-up transformer that accomodates a wide range of flourescent tube wattages.

It is a feature of the invention that one of the dual primary coil provides increased impedance only during the starting operation of the flourescent tube.

BRIEF DESCRIPTION OF THE INVENTION

An insect electrocution apparatus utilizes a dual coil primary as a part of a ballast/step-up transformer. An insect attracting flourescent tube is electrically connected between the two primary coils. The filaments of the flourescent tube are series connected through a conventional starter and one of the two primary coils of the ballast/step-up transformer. Both coils are in the starting circuit of the insect electrocution apparatus. After ignition of the flourescent tube, the second primary coil and starter are removed from the operating circuit.

BRIEF DESCRIPTION OF THE DRAWINGS

The objects and features of the invention described above will best be understood from a detailed description of a preferred embodiment of the invention shown in the accompanying drawings in which.

DETAILED DESCRIPTION OF THE INVENTION

Figure 1:
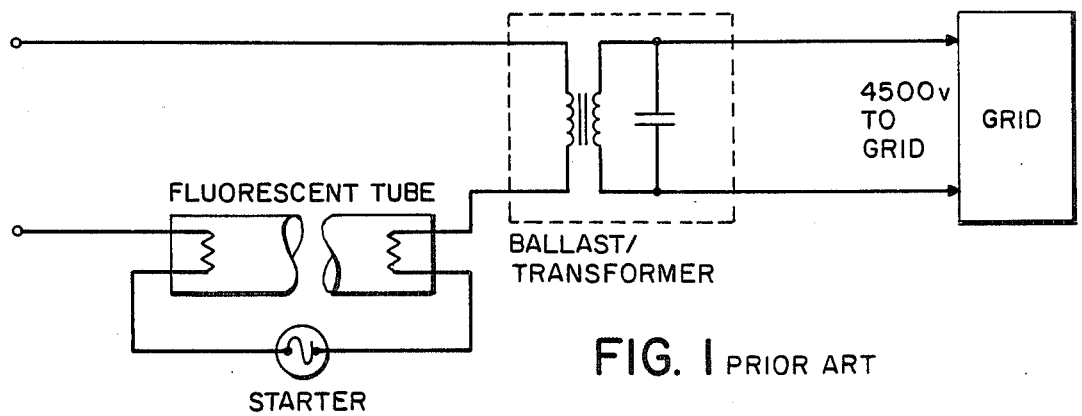
FIG. 1 is a diagram in partial block and schematic form illustrating a prior art insect electrocution apparatus.

Turning now to the drawings, FIG. 1 illustrates a prior art insect electrocution apparatus indicated generally by the reference numeral 10. The insect electrocution apparatus comprises an insect attracting flourescent tube 12 and a ballast/step-up transformer 14 that provides high voltage to an insect electrocution grid 16. The ballast/step-up transformer 14 has a single primary coil 18 and a secondary coil 20 that is shunted by capacitor 22. The flourescent tube 12 has conventional filaments 24 and 26 which are connected in series through a starter 28 having a momentarily actuated switch 30. Alternating current of the required voltage is applied through input contacts 32 and 34 to the starting circuit comprising primary coil 18, filament 24, starter switch 30 and filament 26. Upon ignition of the flourescent tube 12, the starter circuit is interrupted and the insect electrocution apparatus 10 opeates in a conventional manner.

Figure 2:
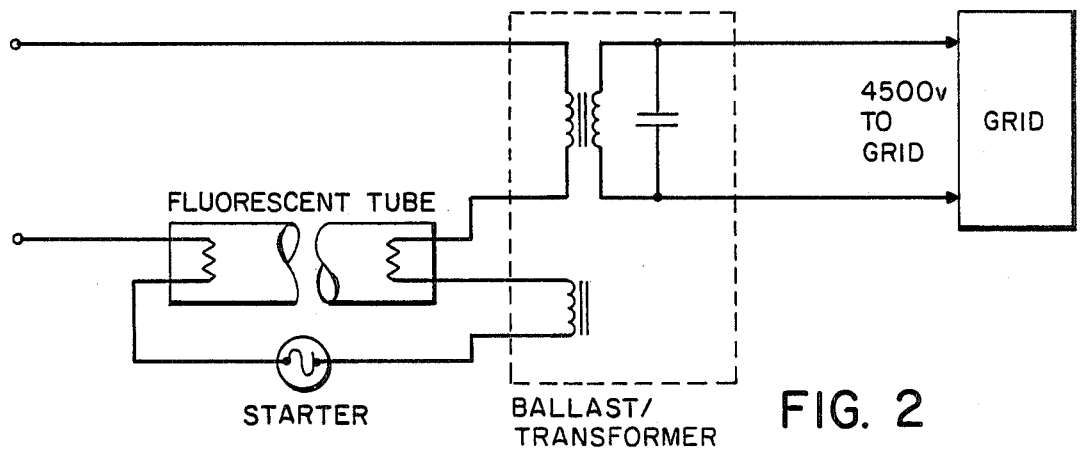
FIG. 2 is a diagram in partial block and schematic form illustrating the insect electrocution apparatus of the present invention during the starting operation; and, FIG. 3 is a diagram in schematic and partial block form showing the insect electrocution apparatus of FIG. 2 after ignition of the flourescent tube.
Figure 3:
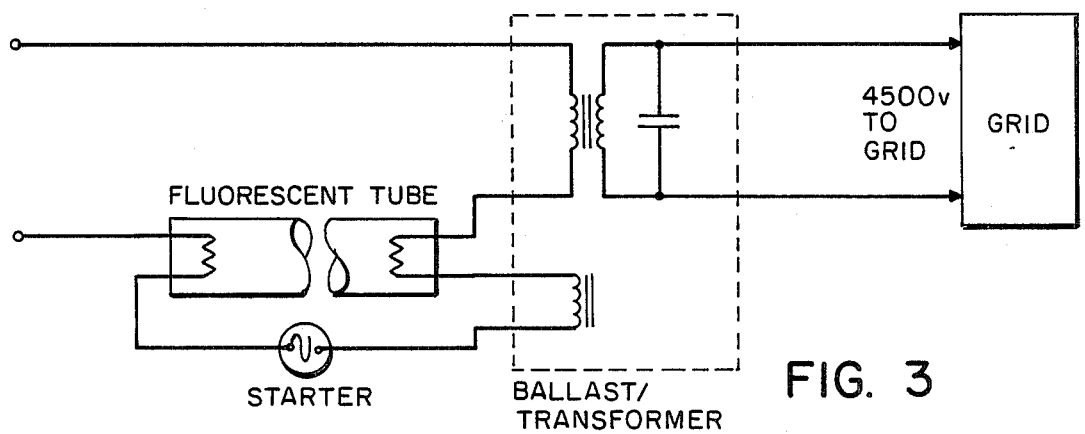

Referring now to FIGS. 2 and 3, the same reference numerals have been used to designate corresponding parts from the electrocution apparatus shown in FIG. 1. The improved electrocution apparatus of the present invention, indicated generally by the reference numeral 11 in FIGS. 2 and 3, has an additional primary coil 36 in the ballast/step-up transformer 14. The extra primary coil 36 is connected in series with the flourescent tube filament 24, starter switch 30 and flourescent tube filament 26. Upon application of alternating current to the input terminals 32 and 34, the additional primary coil 36 provides increased impedance for the starting circuit constituting input terminal 32, the first primary coil 18, filament 24, the second primary coil 36, starter switch 30, flourescent tube filament 26 and input terminal 34. After ignition of the flourescent tube 12, starter switch 30 opens as shown in FIG. 3, thus removing the second primary coil 36 from circuit operation.

Having described in detail a preferred embodiment of my invention, it will now be apparent to those skilled in the art that numerous modifications can be made therein without departing from the scope of the invention as defined in the appended claims.

What I claim is:

1. An insect electrocution appartus comprising:
   (1) a first electrical current input means;
   (2) a second electrical current input means;
   (3) a ballast/step-up transformer means having primary and secondary coil means, said primary coil means comprising first and second primary coils with one end of the first primary coil being connected to said first electrical current input means;
   (4) electrocution grid means connected to said secondary coil means;
   (5) an insect attracting flourescent tube having first and second filaments with said first filament being connected in series between the other end of said first primary coil and one end of said second primary coil and said second filament being connected at one end to said second electrical current input means; and,
   (6) a flourescent tube starter means connected in series between the other end of the insect attracting flourescent tube second filament and the other end of said second primary coil whereby said second primary coil functions as an extension of the first primary coil only upon the starting of the insect attracting flourescent tube to provide increased impedance during the starting operation and thereafter is not part of the operating circuit so that ballast is supplied only by the first primary coil.

2. The insect electrocution apparatus of claim 1 wherein said flourescent tube starter means includes a manually actuated switch means.

3. The insect electrocution apparatus of claim 1 wherein said flourescent tube starter means includes an automatically actuated switch means.

4. A method for controlling the operation of an insect electrocution apparatus having a ballast/step-up transformer with first and second series connected primary coils and a secondary coil; an electrocution grid connected to the secondary coil, an insect attracting flourescent tube, said method comprising the steps of:
   (1) utilizing both of said first and second primary coils as part of a starting circuit for said insect attracting flourescent tube; and, after starting the flourescent tube,
   (2) utilizing only the first primary coil as part of an operating circuit of said insect attracting flourescent tube, said first primary coil providing ballast for said flourescent tube.

5. The method of claim 4 wherein the insect attracting flourescent tube is connected at one end between the first and second primary coils and the flourescent tube starter is connected in series with the second primary coil so that upon termination of the operation of the flourescent tube starter, the second primary coil is rendered inoperative.

* * * * *